United States Patent Office 3,446,711
Patented May 27, 1969

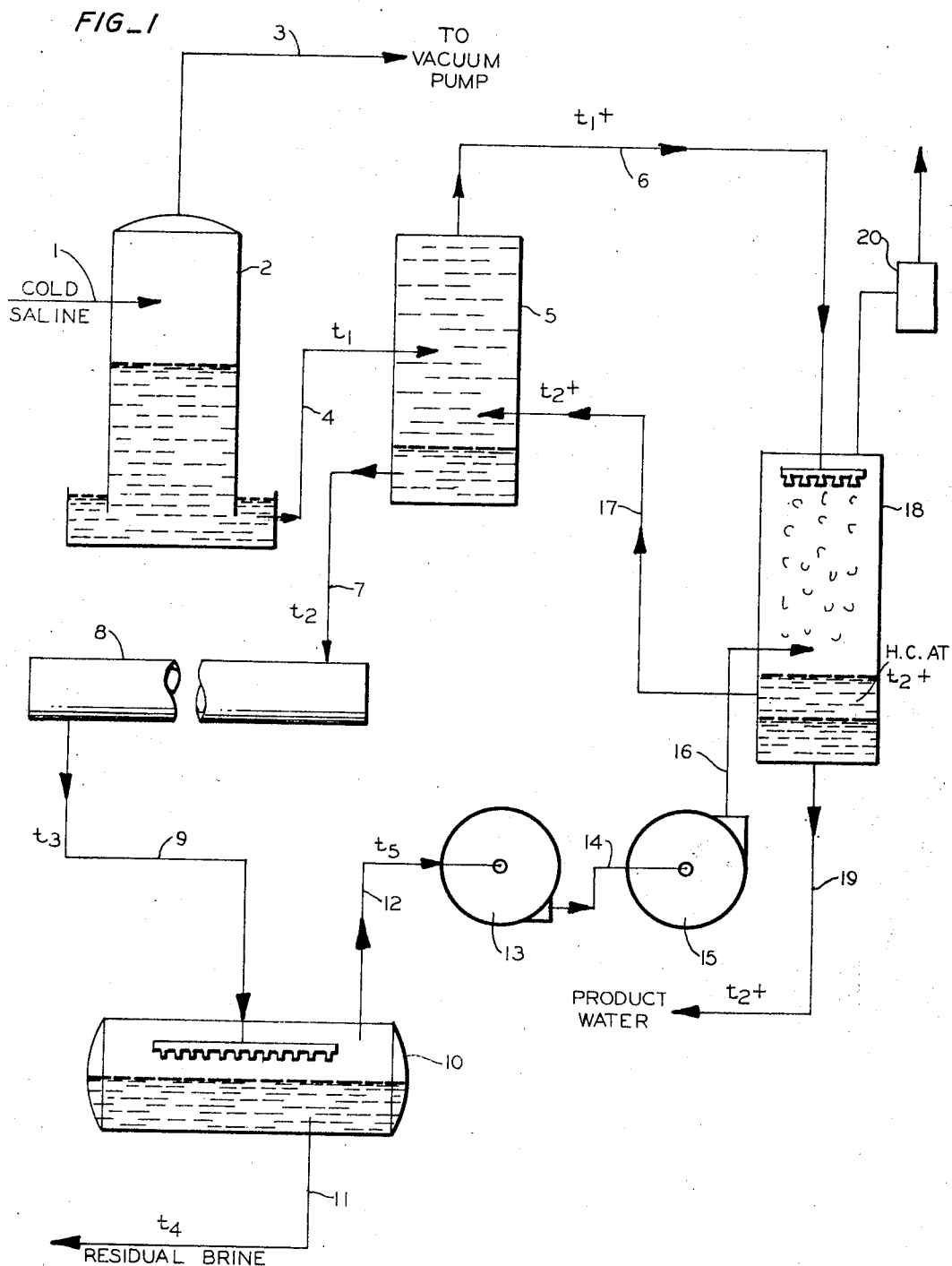

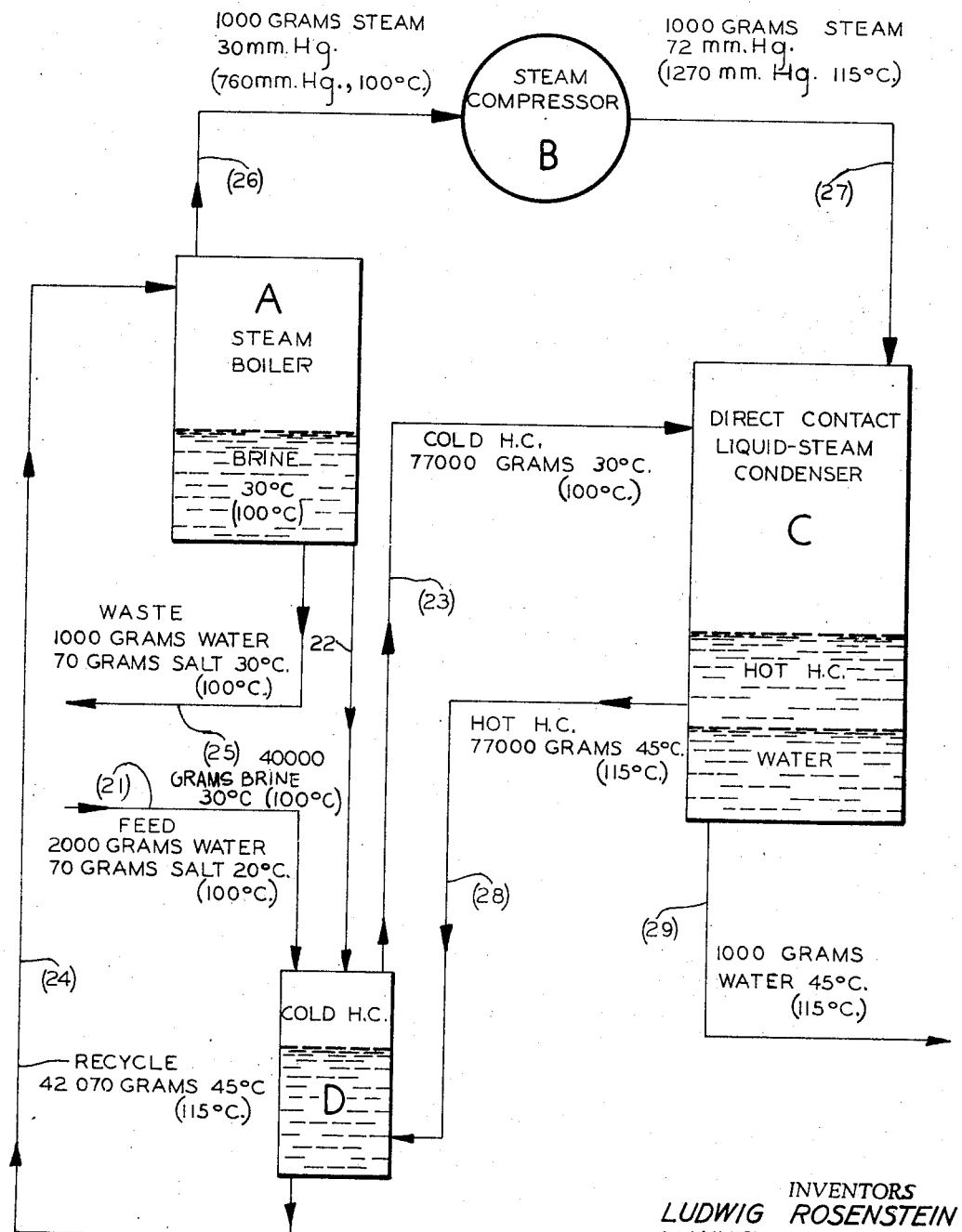
FIG_2

3,446,711
WATER PURIFICATION PROCESS USING A LIQUID HYDROCARBON AS A HEAT TRANSFER MEDIUM
Ludwig Rosenstein, 2010 Lyon St., San Francisco, Calif. 94115, and Manuel H. Gorin, 57 Corte Ramon, Greenbrae, San Rafael, Calif. 94901
Continuation-in-part of application Ser. No. 178,386, Mar. 8, 1962. This application Dec. 3, 1964, Ser. No. 415,590
Int. Cl. C02b 1/06; B01d 3/10
U.S. Cl. 203—10      2 Claims

ABSTRACT OF THE DISCLOSURE

The process for recovering water from aqueous solutions of nonvolatile compounds including the steps of heating the solution in direct contact counter-current heat exchange with substantial temperature inversion with an immiscible heat exchange liquid, then evaporating water vapor from the solution, compressing the water vapor and condensing the water vapor with the immiscible heat exchange fluid which was cooled in the original warming step, separating part of the water from the concentration step and recycling the thus warmed immiscible heat exchange fluid to the first solution warming step.

---

This application is a continuation in part of our copending application Ser. No. 178,386, filed Mar. 8, 1962 with the same title and now abandoned.

The invention relates to evaporation processes and particularly to such processes for the desalination of sea water and other saline liquids. The process is also useful in many other environments in which vaporization and condensation play a significant role.

It is an object of our invention to provide an improved and economical concentration process particularly effective to utilize heat available in large quantities but at relatively low temperatures. Solar radiation is one example of this form of energy, and the warm liquids discharged from atomic reactors are another source of such energy.

Other objects together with the foregoing are attained in the embodiment of the invention described in the following description and illustrated in the accompanying drawings, in which:

FIGURE 1 is a flow diagram showing one form of apparatus useful in carrying out the process of the invention; and FIGURE 2 is a flow diagram illustrating the process of the invention with specific values of two examples shown thereon.

An outstanding characteristic of the present invention is that it provides a close practical approach to the theoretical minimum thermal energy requirement for accomplishing the result. The theoretical minimum is approached by utilizing systems of coordinated heat transfers, preferably designated as "direct contact, counter current, liquid-liquid heat transfer with temperature inversion."

This phrase refers primarily to the operation of bringing two immiscible liquids, inert toward each other, and each at a different temperature into intimate, continuous and wholly counter current heat transfer relationship with such a relative flow rate that the quantity of the colder liquid will be almost exactly just sufficient to accept the heat transferred to it by the warmer liquid so that the initially colder liquid thereby comes to substantially the entering temperature of the warmer liquid, while the initially warmer liquid thereby comes to substantially the entering temperature of the colder liquid. The utilization of liquid-liquid heat transfer with temperature inversion is an effective application of the first and second laws of thermodynamics. In any process, the minimum energy is required when the process is carried out (a) isothermally and (b) reversibly. While just the theoretical minimum energy can never be practically used, it is an object herein to approach the theoretical minimum as closely as physical and economic considerations allow.

To understand the relationship of the indicated thermodynamic laws to a thermal desalination process, consider a box in which an unknown process carried out by unknown apparatus takes place. Into the box is fed sea water at normal temperature, say 20° C., along with a supply of energy. Consider that from the box emerges some fresh water at 20° C. and some brine at 20° C. These conditions meet the requirement that the process be isothermal in that the initial and final temperatures are the same. Whatever the process in the box may be, its consequence has been the separation of fresh water and brine, and this has been done isothermally. It is understood that while there may be temperature changes within the box, these are necessarily reversible changes and they do not prevent the initial and final temperatures of the system from being the same. The primary change that has taken place has been a change of concentration of the starting material to one portion that is less salty and another portion that is saltier.

The requirement for reversible changes is that the differences of the potential of the energy at each step shall be differential, that is to say, differential temperature differences.

While exactly differential conditions and perfect equalities between entrant and exit temperatures cannot in practice be attained, they can in accordance with the present disclosure be very closely approached. This accomplishment is partly due to having direct liquid-liquid heat transfer. But this in itself is not enough. This accomplishment is also due to having in addition thereto the condition that the heat exchanging liquids enter with a certain temperature relationship and emerge with this temperature relationship inverted, that is, with their temperatures exchanged.

This can be illustrated by a pilot plant test involved in a freezing process of desalination. In this example, sea water at 17° C. was brought into direct heat exchange relationship with octane, a normally liquid hydrocarbon at −5° C. The sea water consequently should leave the apparatus at approximately −.5° C., while the octane should leave the apparatus close to 17° C. The heat exchange apparatus was an insulated, vertical column into which sea water was continuously introduced at the top and octane in drop form was introduced at the bottom. The column contained a continuous phase of sea water through which the drops of octane moved upwardly. The octane was continuously withdrawn at the top and sea water was continuously withdrawn at the bottom. The flow of sea water was controlled at a rate of 106 kilograms per minute, while the octane was controlled to flow at the rate of 196 kilograms per minute.

The actual temperature measurements at top and bottom of the column were that the sea water entered at 17° C. and left at 2° C., whereas the octane entered at −.5° C. and left at 15.5° C. This close approach to the theoretical values can be made even closer if desired with further refinements in insulation, in slower flow rates and comparable factors, such as time of contact. The flow rates indicated were calculated from the specific heats of sea water (0.954) and octane (0.515) as follows. The heat loss of the sea water in dropping from 17° C. to −.5° C. is 106×17.5×.954=1770 kilo calories per minute The heat gain of the octane is rising from −5° C. to 17° C. is $$M \times 17.5 \times 0.515 = 1770 \text{ kilo calories per minute}$$

wherein M, the mass of the octane, is 196 kilograms per minute, the values being rounded off. These calculations neglect the slight variations in specific heats over the temperature range. It will be observed that there is a liquid-liquid heat transfer with a substantial temperature inversion.

The temperature difference between the heat exchanging, immiscible liquids is small at any cross section of the column, even though the temperature difference between the top and the bottom of the column is relatively large. In the preceding example, the sea water temperature difference between top and bottom was 15° C. and the octane temperature difference between top and bottom was 16° C., but the difference between the sea water and the octane temperature at the top was only 2.5° C. and at the bottom was only 2.5° C. and had the same value through the height of the column. The smaller the temperature difference between the heat exchanging liquids can be made, the nearer the process approaches being reversible in the thermodynamic sense and the higher the efficiency. In fact, in the example given, by varying the parameters of the experiment it was easily possible to bring the uniform temperature difference between the heat exchanging liquids to a value approximating .5° C.

Our process is also characterized by the cyclic character of the operation of two such heat transfer apparatuses with respect to each other. That is to say, the heat absorbed in one apparatus by the temperature inversion and liquid-liquid transfer is made substantially equal to the heat liberated in a second apparatus of a similar character, so that the temperature inversion in each apparatus is extended to become a temperature inversion in the entire setup.

In one embodiment as shown in FIGURE 1, there is provided a plant for the production of fresh water from sea water, the energy being supplied by any suitable means such as a solar heater as the external heat source necessary during the operation of the process and particularly to supply the energy necessary in starting the process. In the flow arrangement shown in FIGURE 1, the cold sea water enters by a line or pipe 1 to a deaerator 2 from which unwanted gas is removed through a line 3 by means of a vacuum pump. From the deaerator cold brine at a temperature $t_1$ passes by a line 4 to a liquid-liquid heat exchanger 5 wherein it meets a warm hydrocarbon entering through a line 17 at temperature $t_2+$. From the heat exchanger 5, warm saline liquid at temperature $t_2$ passes through a line 7 to a solar heater 8 from which hot saline liquid at temperature $t_3$ passes by a line 9 to an evaporator 10.

From the bottom of the evaporator 10 waste brine at a temperature $t_4$ is discharged through a line 11. From the top of the evaporator 10 water vapor at temperature $t_5$ passes through a line 12 to a vacuum pump 13. From the vacuum pump 13 the water vapor is discharged through a line 14 to a compressor 15. The work of the vacuum pump and of the compressor 15 also represents the addition of energy to the system. The load on the compressor is determined by the ratio of the vapor pressures of water above the saline liquid at the temperatures $t_5$ to $t_2$. Compressed water vapor passes through a line 16 to a condenser 18 wherein it meets a rain of cold hydrocarbon at a temperature $t_1+$ coming from the heat exchanger 5 through a line 6. From the condenser 18 product water at temperature $t_2+$ is drawn off through a line 19 and warm hydrocarbon at temperature $t_2+$ passes through the line 17 to the heat exchanger 5, thus completing the cycle. The condenser 18 may be equipped with a relief valve 20 through which noncondensible gas can be vented to an auxiliary vacuum pump or aspirator.

The foregoing generalized process can serve as a way of concentrating aqueous solutions where the concentrated solution is the desired product as well as the water. In such an instance also, the first more concentrated product may be recycled to get a second, still more concentrated product, and this recycling can be repeated until a desired concentration has been reached. The same consideration applies to a saline liquid. The more concentrated exit brine in the line 11 from the evaporator 10 may be recycled to evaporate more water from it. While the source of outside heat is indicated as solar, the heat may be from any other source since the process as a whole is not thereby affected.

Generally, "hydrocarbons" such as kerosene and octane have been named as heat exchange media. Preferably, the exchange medium is referred to as an immiscible liquid since what is required is a fluid that is immiscible with water and does not react with water and one which is nonvolatile within the temperature ranges used and the density of which is different from that of the aqueous solution with which the heat exchange is accomplished.

In the example illustrated by FIGURE 2, the principal mechanisms include a counter current, liquid-liquid heat exchanger and a direct contact, immiscible liquid-steam condenser wherein the heat given up by the immiscible liquid in the heat exchanger is restored to it in the condenser.

The arrangement of FIGURE 2 is for desalination by vapor compression, the heat energy being put in by and at the compressor. As a first example (bare numbers), the output is 1,000 grams of water at 45° C. and 1,070 grams of brine (1,000 grams of water and 70 grams of salt) at 30° C. representing an application of about 585 kilo calories to the work of separation. The energy input to the compressor is about 35 kilo calories; that is, about 6% of the total heat of vaporization required. While further heat recovery or less heat supply can be accomplished, it is usually not economical to provide the apparatus to do so, and a cut-off point is arbitrarily established between the economical plant and the recovery desired. The process, however, theoretically can be continued indefinitely. No attempt is made to illustrate all of the pipes, valves, transfer pumps and the like, but only the four major items of apparatus are shown. These are a boiler A in which evaporation takes place, a compressor B in which steam generated in the boiler A is subsequently compressed, a condenser C in which the compressed steam is then condensed, and a liquid-liquid heat exchanger D in which heat transfer takes place resulting in temperature inversion.

In the first example, sea water containing 2,000 grams of water plus 70 grams of salts enters the process at a temperature of 20° C. by a line 21 leading into the heat exchanger D. The heat exchanger D also receives 40,000 grams of brine at a temperature of 30° C. by the line 22 from the boiler A. The heat exchanger returns to the boiler A 42,070 grams of brine at 45° C. by means of a line 24.

In the boiler A, 1,000 grams of steam is generated entirely by the sensible heat content of the recycled liquid received from the heat exchanger D. The average pressure of the steam is 31 millimeters of mercury. Evaporation reduces the temperature of the steam to 30° C. A side stream of waste brine consisting of 1,000 grams of water plus 70 grams of salts leaves the boiler A at 30° C. by means of a line 5.

The compressor B receives 1,000 grams of steam from the boiler A through a line 26 at a pressure of 31 millimeters of mercury and compresses this steam to a pressure of 72 millimeters of mercury, thereby adding energy and so raising its temperature to 110° C. The compressed steam leaves the compressor B by a line 27 and enters the condenser C.

Also entering the condenser C by a line 23 is 77,000 grams of relatively nonvolatile, hydrocarbon heat exchange liquid arriving at a temperature of 30° C. from the heat exchanger D. The heat exchange contact between the cold hydrocarbon and the compressed steam results in condensation from the steam of 1,000 grams of water at 45° C. and heating of the hydrocarbon to 45° C. One thousand grams of product water at 45° C. leave the condenser C by a line 29.

Seventy-seven thousand grams of hydrocarbon at 45° C. leave the condenser C by a line 28 and enter the heat exchanger D to meet 42,070 grams of sea water plus brine at approximately 26° C. The resulting liquid-liquid heat transfer with temperature inversion cools the hydrocarbon to approximately 30° C., at which temperature it leaves the heat exchanger D by the line 23 and enters the condenser C, as described. The brine receives the heat of evaporation stored in the hydrocarbon and is thereby heated to 45° C. and then leaves the heat exchanger through the line 24 to reenter the boiler A, as described, thus completing the cycle.

The quantitative figures used in this example are determined from well-known specific heats of sea water, brine, water and hydrocarbon. The energy input to the compressor and the exit temperature of the steam follow from the adiabatic compression of the gas and the known specific heats of steam at the indicated temperatures and pressures.

The quantities stated are those necessary and sufficient with very narrow limits to produce a direct, liquid-liquid heat transfer with temperature inversion. The fact that actual values do not correspond exactly with the theoretical or calculated values is due to the unavoidable heat losses from any system because of radiation and conduction and the like. There is also some loss due to the practical impossibility of achieving perfect temperature inversion. The greater the temperature differences between the heat exchanging immiscible liquids at entrance and exit, the greater the loss will be, but while the theoretical maxima can be approached more and more closely, it is often the case that the cost of the necessary equipment is not entirely justified. Yet the indicated process will involve the minimum amount of equipment necessary to achieve any desired result.

It is often the case that there is readily available a source of a large amount of low temperature heat, in which instance the initial sea water can be raised from its normal temperature to a somewhat higher temperature. The same process can be followed (using the numbers in parentheses) through the flow sheet of FIGURE 2 but with some different values, primarily for temperature. It can be assumed, as a second example, that sea water at 100° C. is available. In this case, sea water containing 2,000 grams of water plus 70 grams of salts enters the process at the temperature of 100° C. by the line 21 leading into the heat exchanger D. This heat exchanger also receives 40,000 grams of brine at 100° C. from the boiler A by the line 22 and returns to the boiler A 42,070 grams of brine at 115° C. through the line 24.

In the boiler A, 1,000 grams of steam is generated entirely by the sensible heat content of the recycled liquid received from the heat exchanger D. The average pressure of the steam is 760 millimeters of mercury and its temperature is 100° C. Waste brine consisting of 1,000 grams of water plus 70 grams of salts will leave the boiler A at 100° C. through the line 25. The steam leaves the boiler A through the line 26 leading to the compressor B. One thousand grams of steam from the boiler A at 100° C. and 760 millimeters of mercury are compressed to 1,270 millimeters of mercury with a concomitant temperature increase to 115° C.

The compressed steam leaves the compressor B by the line 27 and enters the condenser C. Relatively nonvolatile hydrocarbon heat exchange liquid in the amount of 77,000 grams enters the condenser C at 100° C. by the line 23 coming from the heat exchanger D. The condenser C operates under pressure and 1,000 grams of water at 115° C. is the product which leaves the system by the line 29. The 77,000 grams of hydrocarbon is heated to 115° C. and leaves the condenser by the line 28. This latter material enters the exchanger D. designed for pressure operation, wherein the liquid meets 42,070 grams of sea water plus brine at 100° C. Direct, liquid-liquid heat transfer with temperature inversion cools the hydrocarbon to 100° C. and heats the saline liquid to 115° C., thus completing the cycle.

In this second example, the quantitative figures are approximate, although the energy quantities being transferred are nearly the same as those in the first example. The process as described operates through a wide temperature and pressure range with comparable values calculated from those normally available. If economic considerations permit, the product brine and the product water need not leave the process at the temperatures indicated, since direct, liquid-liquid heat transfer with themperature inversion may again be applied to them and the recovered energy transferred to the sea water feed to raise its temperature to approximately the initial 100° C. indicated.

In the preceding examples, the temperature difference of 15° C. between the boiler and condenser can be reduced, if desired, and as it is reduced, the energy input to the compressor is similarly reduced. Yet, the smaller the temperature difference, the larger the pumping load is to recycle the saline liquid and the immiscible heat transfer liquid.

Depending upon the compression ratios actually employed and various heat losses to the atmosphere, the heat of condensation of the steam generated in the boiler may be less than sufficient, about sufficient or more than sufficient to evaporate the planned amount of water. If there is excess heat available due to a high compression ratio and high heat of compression, the excess can be removed by cooling the immiscible heat transfer liquid with an additional portion of cold saline liquid. The latter does not flow to the boiler, but is returned to its source or is otherwise disposed of simply as a carrier of excess heat. In the case where a low compression ratio does not supply sufficient heat, an additional amount is supplied from an external source such as solar heat or any other convenient thermal energy input. External heat is necessary to start the operation of the plant in the first instance.

An economic factor is the temperature level of the operation. For a given temperature drop between inlet and outlet saline liquid to and from the evaporator, the size of the evaporator and of the steam lines will decrease rapidly with an increase of operating temperature and the corresponding operating pressure. At a relatively high average operating temperature, it becomes desirable to recover at least the heat content of the exit waste brine and of the product water. Here again, the direct contact, liquid-liquid heat transfer with temperature inversion is our preferred method, although conventional heat exchangers may also be used.

If a very cheap source of heat energy is available, it can be used to heat the saline liquid in its travel from the heat exchanger to the evaporator, but it then becomes necessary to remove this same amount of heat from the process by means of further heat exchange in order to maintain a balance. The removal can be done by employing additional amounts of cold saline liquid in the liquid-liquid heat exchanger and subsequently dissipating the heat absorbed by the cold saline liquid.

The process may be carried out not only in a single stage as described, but also in a multiple system having a compressor, a condenser and a boiler for each set or stage of the heat exchanger.

The process may also be used in multiflash distallation, especially when waste heat or cheap heat is available, in which instance the compressor may be eliminated. The technique of direct contact, liquid-liquid heat transfer with temperature inversion is then used to transmit the heat of condensation of steam from one stage to the next. In such system, the heat is supplied from an external source to the first stage at the highest temperature and is dissipated from the system at the last, lowest temperature stage. The various intermediate stages each receive heat of condensation from the preceding stage.

We claim:
1. A process for recovering water from a cold aqueous solution of nonvolatile matter comprising:
   (1) evaporating part of the water of said solution to provide steam and to leave a more concentrated solution;
   (2) then continuously separating said steam from said more concentrated solution;
   (3) then compressing said separated steam;
   (4) then continuously flowing said compressed steam in direct contact with an oppositely flowing supply of a normally liquid hydrocarbon, said immiscible heat transfer liquid being at a lower temperature than said compressed steam, thereby condensing said steam into water and heating said immiscible liquid;
   (5) then separating said water and said hydrocarbon;
   (6) then continuously flowing said immiscible liquid from step (5) in continuous, direct, counter-current, temperature inversion, contact with an additional portion of said aqueous solution at a lower temperature than said hydrocarbon liquid whereby said hydrocarbon is cooled substantially to the temperature of said additional cold aqueous solution and said additional cold aqueous solution is heated substantially to the temperature of said immiscible liquid;
   (7) then transferring said heated aqueous solution of step (6) to step (1);
   (8) then transferring said cooled immiscible liquid of step (6) to step (4);
   (9) recovering said water from step (5); and
   (10) recovering at least part of said more concentrated solution from step (1).

2. A process for recovery of water from sea water, comprising:
   (1) purging said sea water of entrained gas;
   (2) heating sea water from step (1) by direct, counter-current contact with a proportion of warm normally liquid hydrocarbon such that the exit temperature of the sea water becomes substantially equal to the entrant temperature of the normally liquid hydrocarbon; and the exit temperature of the normally liquid hydrocarbon is cooled to substantially the initial temperature of the sea water;
   (3) adding a minor amount of external heat as solar heat only to said sea water from step (2);
   (4) producing steam from said sea water from step (3);
   (5) compressing the steam from step (4);
   (6) condensing the compressed steam from step (5) by direct contact with the normally liquid hydrocarbon, thereby heating said hydrocarbon;
   (7) separating the condensate from step (6) into water and hydrocarbon; recycling said warm hydrocarbon to step (2), and recovering said water.

References Cited
UNITED STATES PATENTS

| | | | |
|---|---|---|---|
| 1,547,893 | 7/1925 | Bergius. | |
| 1,905,185 | 4/1933 | Morris | 196—120 |
| 1,939,418 | 12/1933 | Silver | 203—10 |
| 2,417,131 | 3/1947 | Schmitt. | |
| 2,843,536 | 7/1958 | Mount | 202—234 |
| 2,976,224 | 3/1961 | Gilliland. | |
| 3,181,600 | 5/1965 | Woodward et al. | 165—1 |
| 3,205,671 | 9/1965 | Rosenstein et al. | 62—58 |
| 3,219,554 | 11/1965 | Woodward. | |
| 3,232,847 | 2/1966 | Hoff. | |
| 3,236,747 | 2/1966 | Margiloff. | |

WILBUR L. BASCOMB, Jr., *Primary Examiner.*

U.S. Cl. X.R.

165—1; 202—176, 177, 185, 234; 203—11, 24, 52, 70, 100